(12) United States Patent
Zhang et al.

(10) Patent No.: US 12,316,903 B2
(45) Date of Patent: May 27, 2025

(54) VIDEO PLAYBACK CONTROL METHOD AND APPARATUS, ELECTRONIC DEVICE AND STORAGE MEDIUM

(71) Applicant: Beijing Bytedance Network Technology Co., Ltd., Beijing (CN)

(72) Inventors: Tianyu Zhang, Beijing (CN); Weishu Mo, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/089,287

(22) Filed: Dec. 27, 2022

(65) Prior Publication Data

US 2023/0132567 A1    May 4, 2023

Related U.S. Application Data

(63) Continuation of application No. PCT/CN2021/100196, filed on Jun. 15, 2021.

(30) Foreign Application Priority Data

Jun. 30, 2020  (CN) ......................... 202010617537.8

(51) Int. Cl.
  *H04N 21/431*  (2011.01)
  *H04N 21/472*  (2011.01)
(52) U.S. Cl.
  CPC ... *H04N 21/4312* (2013.01); *H04N 21/47217* (2013.01)
(58) Field of Classification Search
  CPC ............... H04N 21/4312; H04N 21/47217
  See application file for complete search history.

(56) References Cited

U.S. PATENT DOCUMENTS

| | | | |
|---|---|---|---|
| 2003/0089218 A1* | 5/2003 | Gang | G11B 27/34 84/615 |
| 2008/0066102 A1 | 3/2008 | Abraham et al. | |

(Continued)

FOREIGN PATENT DOCUMENTS

| | | |
|---|---|---|
| CN | 103096172 A | 5/2013 |
| CN | 105898610 A | 8/2016 |

(Continued)

OTHER PUBLICATIONS

Lip Dub: How it works https://www.youtube.com/watch?v=k3Wznqu5XSA May 27, 2015 "LipDub" figures 1-4.*

(Continued)

*Primary Examiner* — Sherrod L Keaton
(74) *Attorney, Agent, or Firm* — Alleman Hall & Tuttle LLP

(57) ABSTRACT

Embodiments of the present disclosure provide a video playback control method and apparatus, an electronic device and a storage medium. The method includes: receiving a first video playback instruction, where the first video playback instruction is triggered to be generated when a user clicks a video playback control within a first target display area in a music list display interface; and playing a first target video in the first target display area and expanding a height of the first target display area to a set height value, where the first target video takes a first target music, corresponding to the first target music item displayed in the first target display area, as background music. By adopting the above technical solution, the embodiment of the present disclosure may realize a function of playing, through the music list, a video whose background music is the music in the music list.

16 Claims, 10 Drawing Sheets

(56) References Cited

U.S. PATENT DOCUMENTS

| | | | |
|---|---|---|---|
| 2010/0058253 A1* | 3/2010 | Son | G06F 3/04883 455/566 |
| 2010/0229094 A1 | 9/2010 | Nakajima et al. | |
| 2014/0035831 A1* | 2/2014 | Fino | G06F 3/04883 345/173 |
| 2017/0075468 A1* | 3/2017 | Dziuk | H04L 65/764 |
| 2020/0285439 A1 | 9/2020 | Chen et al. | |
| 2020/0372896 A1* | 11/2020 | Cui | G10L 13/08 |
| 2022/0385984 A1 | 12/2022 | Yuan et al. | |

FOREIGN PATENT DOCUMENTS

| | | | |
|---|---|---|---|
| CN | 107959873 A | 4/2018 | |
| CN | 109189292 A | 1/2019 | |
| CN | 109302538 A | 2/2019 | |
| CN | 109874312 A | 6/2019 | |
| CN | 110968728 A | 4/2020 | |
| CN | 111294637 A | 6/2020 | |
| CN | 111757163 A | 10/2020 | |
| EP | 3438854 A1 | 2/2019 | |
| WO | 2019101185 A1 | 5/2019 | |

OTHER PUBLICATIONS

LipDub (Year: 2015).*
Lip Dub: How it works https://www.youtube.com/watch?v=k3Wznqu5XSA; May 27, 2015 "LipDub" (Year: 2015).*
China National Intellectual Property Administration, Notification to Grant Patent Right for Invention issued in Chinese Application No. 202010617537.8, May 27, 2022, 6 pages (Submitted with English Summary of Notice).
China National Intellectual Property Administration, Notice of Rejection issued in Chinese Application No. 202010617537.8, Jan. 11, 2022, 7 pages.
China National Intellectual Property Administration, the First Office action issued in Chinese Application No. 202010617537.8, May 25, 2021, 19 pages. (Submitted with English Summary of Notice).
China National Intellectual Property Administration, the Second Office action issued in Chinese Application No. 202010617537.8, Aug. 5, 2021, 19 pages. (Submitted with English Summary of Notice).
ISA China National Intellectual Property Administration, International Search Report and Written Opinion issued in Application No. PCT/CN2021/100196, Sep. 22, 2021, WIPO, 13 pages.
European Patent Office, Extended European Search Report Issued in Application No. 21834026.3, Oct. 31, 2023, Germany, 9 pages.

* cited by examiner

VIDEO PLAYBACK CONTROL METHOD AND APPARATUS, ELECTRONIC DEVICE AND STORAGE MEDIUM

CROSS-REFERENCE TO RELATED APPLICATIONS

This application is a continuation of International Application No. PCT/CN2021/100196, filed on Jun. 15, 2021, which claims priority to Chinese Patent Application No. 202010617537.8, filed on Jun. 30, 2020, and entitled "Video Playback Control Method and Apparatus, Electronic Device and Storage Medium". The disclosures of the aforementioned applications are hereby incorporated by reference in their entireties.

TECHNICAL FIELD

Embodiments of the present disclosure relate to computer technologies, and in particular, to a video playback control method and apparatus, an electronic device and a storage medium.

BACKGROUND

With the development of computer technologies and the improvement of qualities of electronic devices, listening to music through the electronic devices has gradually become a popular leisure way for users.

When playing music through an electronic device, a user usually first switches a display interface of the electronic device to a music list display interface, and then clicks a play button on the music list to play songs in the music list, or clicks a play button of one song in the music list to play this song.

However, in the prior art, through the music list, all users can do is only listening to music, and the music list has poor functionality.

SUMMARY

Embodiments of the present disclosure provide a video playback control method and apparatus, an electronic device and a storage medium, so as to realize a function of playing, through the music list, a video whose background music is the music in the music list, thereby enriching the function of a music list.

In a first aspect, an embodiment of the present disclosure provides a video playback control method, including:

receiving a first video playback instruction, where the first video playback instruction is triggered to be generated when a user clicks a video playback control within a first target display area in a music list display interface; and playing a first target video in the first target display area and expanding a height of the first target display area to a set height value, where the first target video takes first target music, corresponding to a first target music item displayed in the first target display area, as background music.

In the second aspect, an embodiment of the present disclosure further provides a video playback control apparatus, including:

a first instruction receiving module, configured to receive a first video playback instruction, where the first video playback instruction is triggered to be generated when a user clicks a video playback control within a first target display area in a music list display interface; and a first video playback module, configured to play a first target video in the first target display area and expand a height of the first target display area to a set height value, where the first target video takes first target music, corresponding to a first target music item displayed in the first target display area, as background music.

In a third aspect, an embodiment of the present disclosure further provides an electronic device, including:
one or more processors;
a memory, configured to store one or more programs,
where the one or more programs, when executed by the one or more processors, enable the one or more processors to implement the video playback control method according to the embodiment of the present disclosure.

In a fourth aspect, an embodiment of the present disclosure further provides a computer-readable storage medium having stored thereon a computer program which, when executed by a processor, implement the video playback control method according to the embodiment of the present disclosure.

In a fifth aspect, an embodiment of the present disclosure further provides a computer program product, where the computer program product includes a computer program carried on a non-transitory computer readable medium, and the computer program, when executed by a processor, causes the processor to implement the video playback control method according to the embodiment of the present disclosure.

In a sixth aspect, an embodiment of the present disclosure further provides a computer program which, when running on an electronic device, causes the electronic device to implement the video playback control method according to the embodiment of the present disclosure.

The video playback control method and apparatus, the electronic device and the storage medium provided by the embodiments of the present disclosure allow for: receiving a first video playback instruction, where the first video playback instruction is generated when a user clicks a video playback control within a first target display area of a first target music item in a music list display interface; playing a first target video in the first target display area and expanding a height of the first target display area to a set height value, where the first target video takes first target music corresponding to the first target music item as background music. By adopting the above technical solution, the embodiments of the present disclosure may realize a function of playing, through the music list, a video whose background music is the music in the music list. When wanting to watch the video, a user may directly click the video playback control in the corresponding display area in the music list, and there is no need for the user to search for the video based on the music item in the music list, thereby improving the convenience for the user to watch videos and saving time for the user to search videos.

BRIEF DESCRIPTION OF THE DRAWINGS

In conjunction with the accompanying drawings and with reference to the following specific embodiments, the above and other features, advantages and aspects of various embodiments of the present disclosure will become more apparent. Throughout the drawings, identical or similar reference numerals refer to identical or similar elements. It should be understood that the drawings are schematic and components and elements are not necessarily drawn to scale.

DESCRIPTION OF EMBODIMENTS

Figure 1:
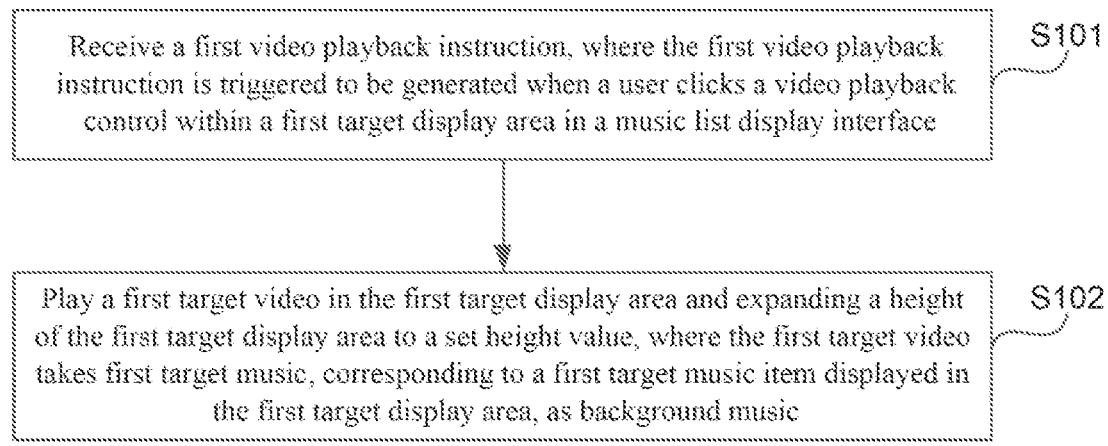
FIG. 1 is a schematic flowchart of a video playback control method provided by an embodiment of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth herein. On the contrary, these embodiments are provided for a more thorough and complete understanding of the present disclosure. It should be understood that the drawings and embodiments of the present disclosure are only for illustrative purposes, and are not intended to limit the scope of protection of the present disclosure.

It should be understood that the steps described in the method implementations of the present disclosure may be performed in different order and/or in parallel. In addition, the method implementations may include additional steps and/or omit the performing steps shown, and the scope of the present disclosure is not limited in this respect.

As used herein, the term "including" and its variations are inclusive including, that is, "including but not limited to". The term "based on" indicates "based at least in part". The term "an embodiment" indicates "at least one embodiment". The term "another embodiment" indicates "at least one further embodiment". The term "some embodiments" indicates "at least some embodiments". Relevant definitions of other terms will be given in the following description.

It should be noted that the concepts such as "first" and "second" mentioned in the present disclosure are only used to distinguish different apparatuses, modules or units, and are not used to limit the order or interdependence of the functions performed by these apparatuses, modules or units.

It should be noted that the modifications of "an" and "multiple" mentioned in the present disclosure are illustrative rather than restrictive, and those skilled in the art should understand that unless otherwise expressly stated in context, they should be understood as "one or more".

The names of messages or information exchanged between multiple apparatuses in the implementations of the present disclosure are only for illustrative purposes, and are not intended to limit the scope of these messages or information.

FIG. 1 is a schematic flowchart of a video playback control method provided by an embodiment of the present disclosure. The method may be executed by a video playback control apparatus, where the apparatus may be implemented by software and/or hardware, and may be configured in an electronic device; typically, it may be configured in a smart phone or a tablet computer. In an implementation, the video playback control method provided by the embodiment of the present disclosure is applicable to a scenario of watching videos through a music list, and in particular, to the scenario of watching short videos shot by other users, where the background music of the short video is the music in the music list.

As shown in FIG. 1, the video playback control method provided by the embodiment of the present disclosure may include the following.

S101, receive a first video playback instruction, where the first video playback instruction is triggered to be generated when a user clicks a video playback control within a first target display area in a music list display interface.

The first video playback instruction may be used to instruct the electronic device to play a video whose background music is the first target music corresponding to the first target music item, the music list display interface is used to display corresponding music list to the user, the music list may include one or more music items, and one music item in the music list may be considered as music information of certain music that needs to be displayed in the music list. For example, the music item of the certain music may include at least one of: a name of the music, singer information and music length information; each music item in the music list may corresponds to a display area, and each music item may be displayed in its corresponding display area. Accordingly, the first target display area may be considered as the display area clicked by the user in the music list display interface, and the first target music item may be considered as the music item displayed in the first target display area.

In this embodiment, the music list displayed in the music list display interface may be a similar (that is, a same type of) music list of certain music or a music list created and collected by the user. For example, the music list is taken as a similar music list of the original music for description below. At this point, the music list display interface displayed by the electronic device may be the similar music list display interface of the original music.

Figure 2:
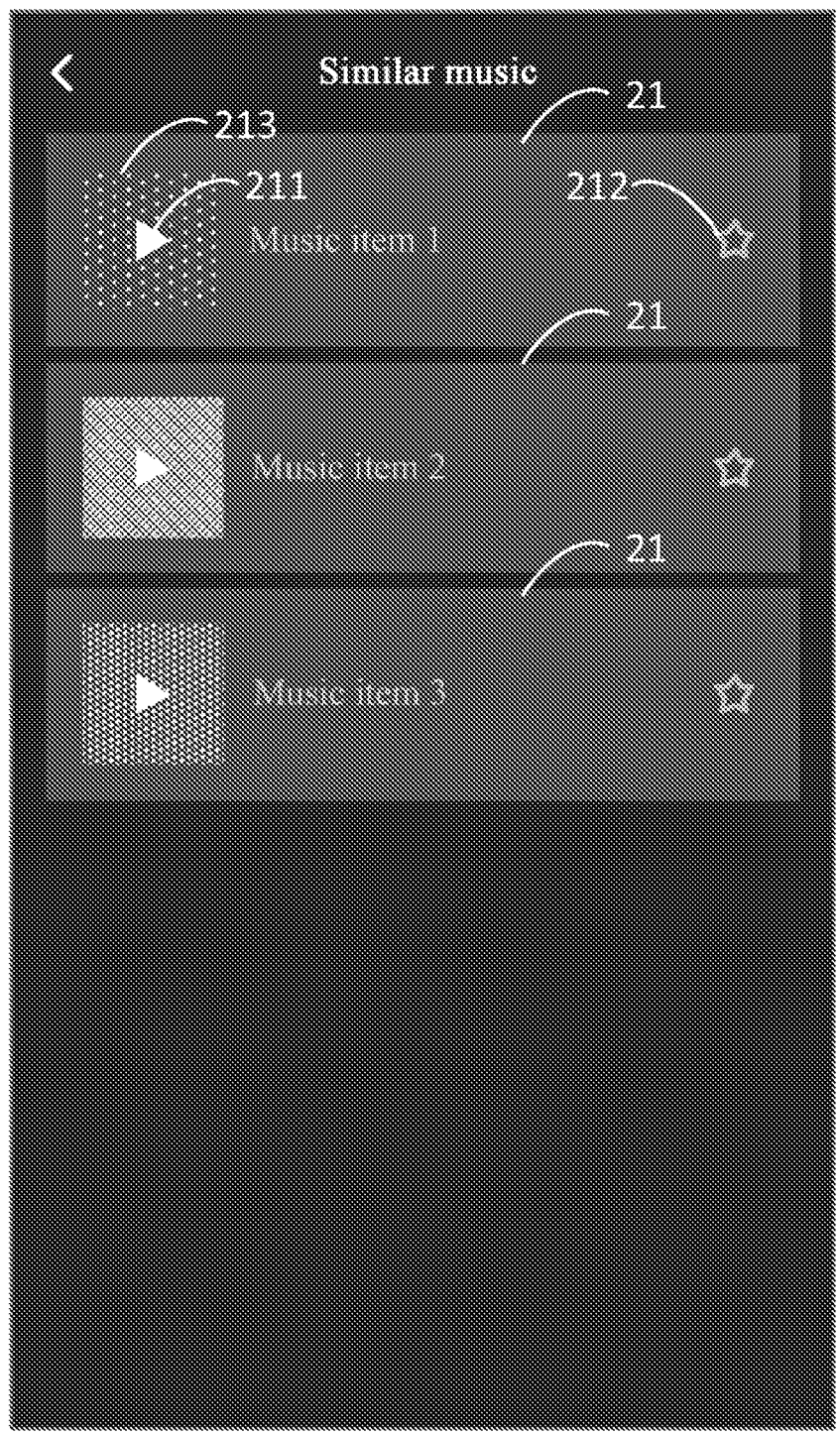
FIG. 2 is a schematic diagram of a music list display interface provided by an embodiment of the present disclosure.

For example, please refer to FIG. 2, the electronic device may display the music list to the user in the music list display interface, where the music list display interface includes at least one display area 21 (for example, there are three display areas in FIG. 2), and the display areas may have the same height and the display areas are in the original height. Each display area may display a music item having a piece of music within the music list and a video playback control 211 for the user to trigger the electronic device to play a video whose background music is the music corresponding to the music item in the display area; and the display area may also display a collection button 212 for the user to collect/un-collect the music corresponding to the music item in the display area, so that the user may collect or un-collect the music corresponding to the music item displayed in the display area by clicking the collection button 212 in one display area. In addition, each display area may also display a music icon 213 of the music corresponding to the displayed music item, and an audio playback control (not shown in the figure) for the user to play/stop playing the music corresponding to the music item in the display area, so that the user may control the electronic device to play/stop playing the corresponding music by clicking the audio playback control.

Specifically, please continue to refer to FIG. 2. After the electronic device displays the music list display interface on the screen, when the user wants to watch the video whose background music is a certain music, he clicks the video playback control displayed in the display area (that is, the first target display area) of the music item (that is, the first target music item) having this piece of music. Accordingly, after the electronic device monitors that the user clicks the video playback control displayed in the first target display area, it is determined that the first video playback instruction is received.

In a specific implementation, it can be switched into the similar music list display interface of the original music from the music detail interface of the original music. At this point, before receiving the first video playback instruction, it may further include: receiving a similar music display instruction when displaying a music detail interface of the original music, where the similar music display instruction is triggered to be generated when the user clicks a similar music control in the music detail interface; and switching the current display interface from the music detail interface to the similar music list display interface of the original music, where the similar music list display interface includes at least one display area, a height of the display area is an original height value, and a music item of similar music of the original music is displayed in the display area. Where the original music may be music being played by the electronic device or the background music of the video being displayed by the electronic device before the similar music list display interface is displayed.

Figure 3:
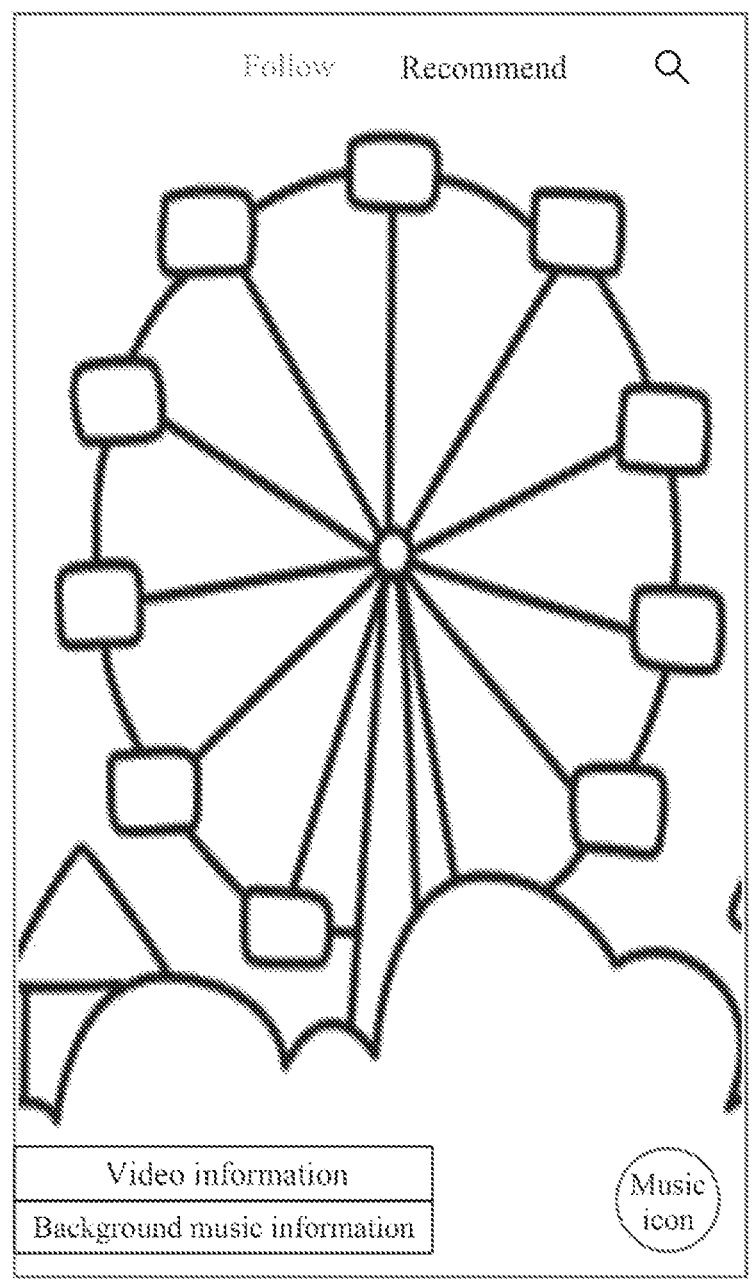
FIG. 3 is a schematic diagram of a video playback interface provided by an embodiment of the present disclosure.
Figure 4:
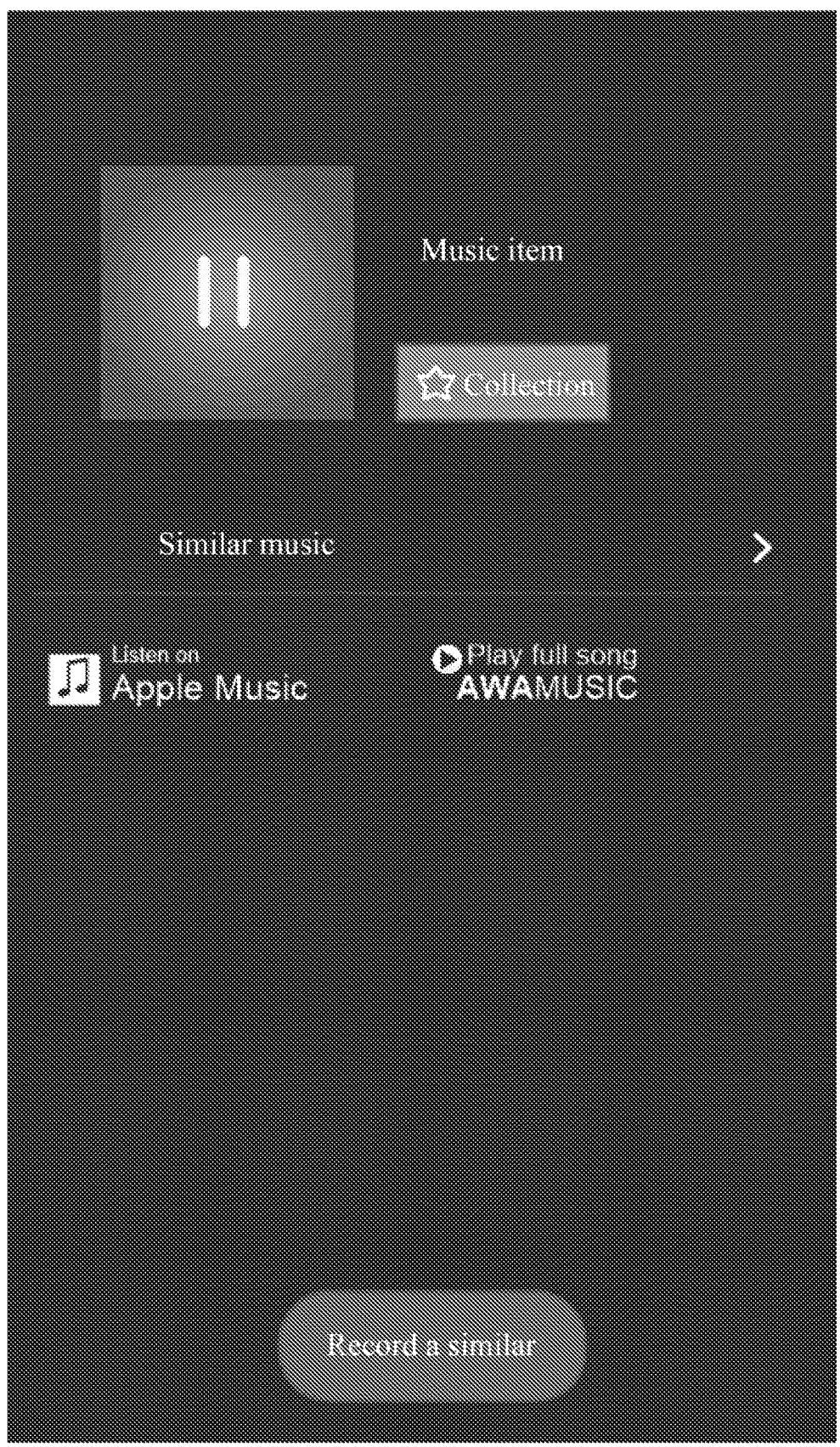
FIG. 4 is a schematic diagram of a music detail interface provided by the embodiment of the present disclosure.

For example, the background music of the video being displayed before the electronic device displays the similar music list display interface is the original music. The electronic device displays the video playback interface based on the trigger operation by the user and plays the video in the video playback interface, as shown in FIG. 3, where the background music of the video is the original music, that is, the background music added in the video being played by the electronic device is determined as the original music. When the user wants to view music details of the background music (that is, the original music) added in the video, he clicks the music icon in the video playback interface or the display area of the background music information. Accordingly, when detecting that the user clicks the music icon, the electronic device determines that the music detail display instruction is received and displays the music detail interface, as shown in FIG. 4. The music detail interface displays a display music control for the user to view the similar music list of the original music. In addition, the music detail interface may also display an audio playback control for the user to play/stop playing the original music and a collection button for the user to collect/un-collect the original music. Therefore, when the user wants to view the similar music list of the original music, he clicks the display music control in the music detail interface; accordingly, when detecting that the user clicks the similar music control, the electronic device determines that the similar music display instruction is received and displays the similar music list display interface of the original music, as shown in FIG. 2. The video displayed in a certain display area may be considered as the video to which the currently displayed video frame in the display area belongs.

S102, play a first target video in the first target display area and expanding a height of the first target display area to a set height value, where the first target video takes first target music, corresponding to a first target music item displayed in the first target display area, as background music.

As for the case that the first target video takes the first target music as the background music, it may be understood as that the background music added in the first target video is the first target music, and the first target video may or may not have audio data other than the added background music; and the set height value may be a preset fixed value or an appropriate height value to which the first target display area may be expanded at present, that is, in case of different locations and/or height expansion modes of the first target display area, the set height value, to which the first target display area is expanded, may be the same or different, and the set height value may be smaller than the height value of the music list display interface.

Specifically, after receiving the first video playing instruction, the electronic device acquires the first target video whose background music is the first target music, and plays the first target video in the first target display area; and moves the upper boundary line of the first target display area displayed in the music list display interface upwards and/or moves the lower boundary line of the first target display area displayed in the music list display interface downwards, to expand the height of the first target display area to a set height value. Where the upper boundary line/the lower boundary line of the first target display area displayed in the music list may be considered as that the upper boundary line/the lower boundary line of the first target display area is required to be within the display range of the electronic device screen during height expansion. At this point, accordingly, if the upper boundary line/the lower boundary line of the first target display area is outside the display range of the electronic device screen, the electronic device may first move the location of the first target display area, so as to move the upper boundary line/the lower boundary line outside the display range of the electronic device screen to the location of the upper interface boundary/the lower interface boundary of the music list display interface, and then expand the height of the first target display area to a set height value.

In this embodiment, in case of expanding the first target display area to the set height value, only the upper boundary line of the first target display area displayed in the list display interface may be moved, or only the lower boundary line of the first target display area displayed in the list display interface may be moved; or both the upper and lower boundary lines of the first target display area displayed in the list display interface may also be moved simultaneously.

In an implementation, the expanding the height of the first target display area to a set height value includes: moving the upper boundary line of the first target display area in the music list display interface upwards until the height of the first target display area reaches the set height value. Where the set height value may be the height value of the first target display area when the upper boundary line of the first target display area is moved upwards to overlap with the interface boundary of the music list display interface, or the set height value may be may be a preset fixed height value.

Specifically, the electronic device moves the upper boundary line of the first target display area upwards until the upper boundary line of the first target display area overlaps with the upper interface boundary of the music list display interface. Alternatively, the electronic device moves the upper boundary line of the first target display area upwards until the height of the first target display area reaches a preset fixed height value. Alternatively, the electronic device moves the upper boundary line of the first target display area upwards until the upper boundary line of the first target display area overlaps with the upper interface boundary of the music list display interface or the height of the first target display area reaches the preset fixed height value, for example, the electronic device moves the upper boundary line of the first target display area upwards, and periodically determines, in the moving process, whether the ordinate of the upper boundary line of the first target area is equal to the ordinate of the upper interface boundary on the music list display interface and whether the distance between the upper and lower boundary lines of the first target display area reaches the preset fixed height value. If the ordinate of the upper boundary line of the first target display area is equal to the ordinate of the upper interface boundary of the music list display interface or the distance between the upper and lower boundary lines of the first target display area reaches the preset fixed height value, the upper boundary line of the first target display area is stopped from moving upwards; otherwise, the upper boundary line of the first target display area is continuously moved upwards until the ordinate of the upper boundary line of the first target display area is equal to the ordinate of the upper interface boundary of the music list display interface or the distance between the upper and lower boundary lines of the first target display area reaches the preset fixed height value.

In this implementation, when moving the upper boundary of the first target display area upwards, the electronic device may also synchronously move display areas of other music items above the first target display area upwards, so as to prevent other music items above the first target display area from being blocked by the expanded first target display area. At this point, preferably, the expanding the height of the first target display area to the set height value further includes: controlling the other display areas above the first target display area in the music list display interface to move upwards synchronously with the upper boundary line.

In another embodiment, the expanding the height of the first target display area to the set height value includes: moving the lower boundary line of the first target display area in the music list display interface downwards until the height of the first target display area reaches the set height value. Where the set height value may be the height value of the first target display area when the lower boundary line of the first target display area is moved downwards to overlap with the interface boundary of the music list display interface, or the set height value may be the preset fixed height value.

Specifically, the electronic device moves the lower boundary line of the first target display area downwards until the lower boundary line of the first target display area overlaps with the lower interface boundary of the music list display interface. Alternatively, the electronic device moves the lower boundary line of the first target display area downwards until the height of the first target display area reaches the preset fixed height value. Alternatively, the electronic device moves the lower boundary line of the first target display area downwards until the lower boundary line of the first target display area overlaps with the lower interface boundary of the music list display interface or the height of the first target display area reaches the preset fixed height value, for example, the electronic device moves the lower boundary line of the first target display area downwards, and periodically determines, in the moving process, whether the ordinate of the lower boundary line of the first target area is equal to the ordinate of the lower interface boundary on the music list display interface and whether the distance between the upper and lower boundary lines of the first target display area reaches the preset fixed height value. If the ordinate of the lower boundary line of the first target display area is equal to the ordinate of the lower interface boundary of the music list display interface or the distance between the upper and lower boundary lines of the first target display area reaches the preset fixed height value, the lower boundary line of the first target display area is stopped from moving downwards; otherwise, the lower boundary line of the first target display area is continuously moved downwards until the ordinate of the lower boundary line of the first target display area is equal to the ordinate of the lower interface boundary of the music list display interface or the distance between the upper and lower boundary lines of the first target display area reaches the preset fixed height value.

In this embodiment, when moving the upper boundary of the first target display area downwards, the electronic device may also synchronously move display areas of other music items below the first target display area downwards, so as to prevent other music items below the first target display area from being blocked by the expanded first target display area. At this point, preferably, the expanding the height of the first target display area to the set height value further includes: controlling the other display areas below the first target display area in the music list display interface to move downwards synchronously with the upper and lower boundary lines.

In the third implementation, the expanding the height of the first target display area to the set height value includes: moving the upper boundary line of the first target display area in the music list display interface upwards until the upper boundary line overlaps with the interface boundary of the music list display interface or the height of the first target display area reaches the set height value; and moving the lower boundary line of the first target display area in the music list display interface downwards until the lower boundary line overlaps with the interface boundary of the music list display interface or the height of the first target display area reaches the set height value. Where the set height value may be the preset fixed height value.

Specifically, when simultaneously moving the upper and lower boundary lines of the first target display area, the electronic device may periodically determine, in the moving process, that whether the ordinate of the upper boundary line of the first target display area is smaller than the ordinate of the upper interface boundary of the music list display interface, whether the ordinate of the lower boundary line of the first target display area is greater than the ordinate of the lower interface boundary of the music list display interface, and whether the distance between the upper and lower boundary lines of the first target display area reaches the set height value. If the ordinate of the upper boundary line of the first target display area is equal to the ordinate of the upper interface boundary of the music list display interface and the distance between the upper and lower boundary lines of the first target display area does not reach the set height value, the upper boundary line of the first target display area is stopped from moving upwards and the lower boundary line of the first target display area is continuously moved downwards until the distance between the upper and lower boundary lines of the first target display area reaches the set height value. If the ordinate of the lower boundary line of the first target display area is equal to the ordinate of the lower interface boundary of the music list display interface and the distance between the upper and lower boundary lines of the first target display area does not reach the set height value, the lower boundary line of the first target display area is stopped from moving downwards and the upper boundary line of the first target display area is continuously moved until the distance between the upper and lower boundary lines of the first target display area reaches the set height value. Otherwise, the upper lower boundary line and the lower boundary line of the first target display area are continuously moved at the same time until the distance between the upper boundary line and the lower boundary line of the first target display reaches the set height value. Where the moving speed values of the upper boundary line and the lower boundary line of the first target display area may be equal.

It can be understood that the electronic device may not simultaneously move the upper boundary line and the lower boundary line of the first target display area. For example, the electronic device preferentially moves the upper boundary line of the first target display area upwards until the upper boundary line of the first target display area overlaps with the upper interface boundary of the music list display interface or the height of the first target display area reaches the set height value, and then moves the lower boundary line of the first target display area downwards until the height of the first target display area reaches the set height value, only when the upper boundary line of the first target display area overlaps with the upper interface boundary of the music list display interface and the height of the first target display area has not yet reached the set height value; alternatively, the electronic device preferentially moves the lower boundary line of the first target display area downwards until the lower boundary line of the first target display area overlaps with the lower interface boundary of the music list display interface or the height of the first target display area reaches the set height value; and then moves the upper boundary line of the first target display area upwards until the height of the first target display area reaches the set height value, only when the lower boundary line of the first target display area overlaps with the lower interface boundary of the music list display interface and the height of the first target display area has not reached the set height value, which is not limited in this embodiment.

Figure 5:
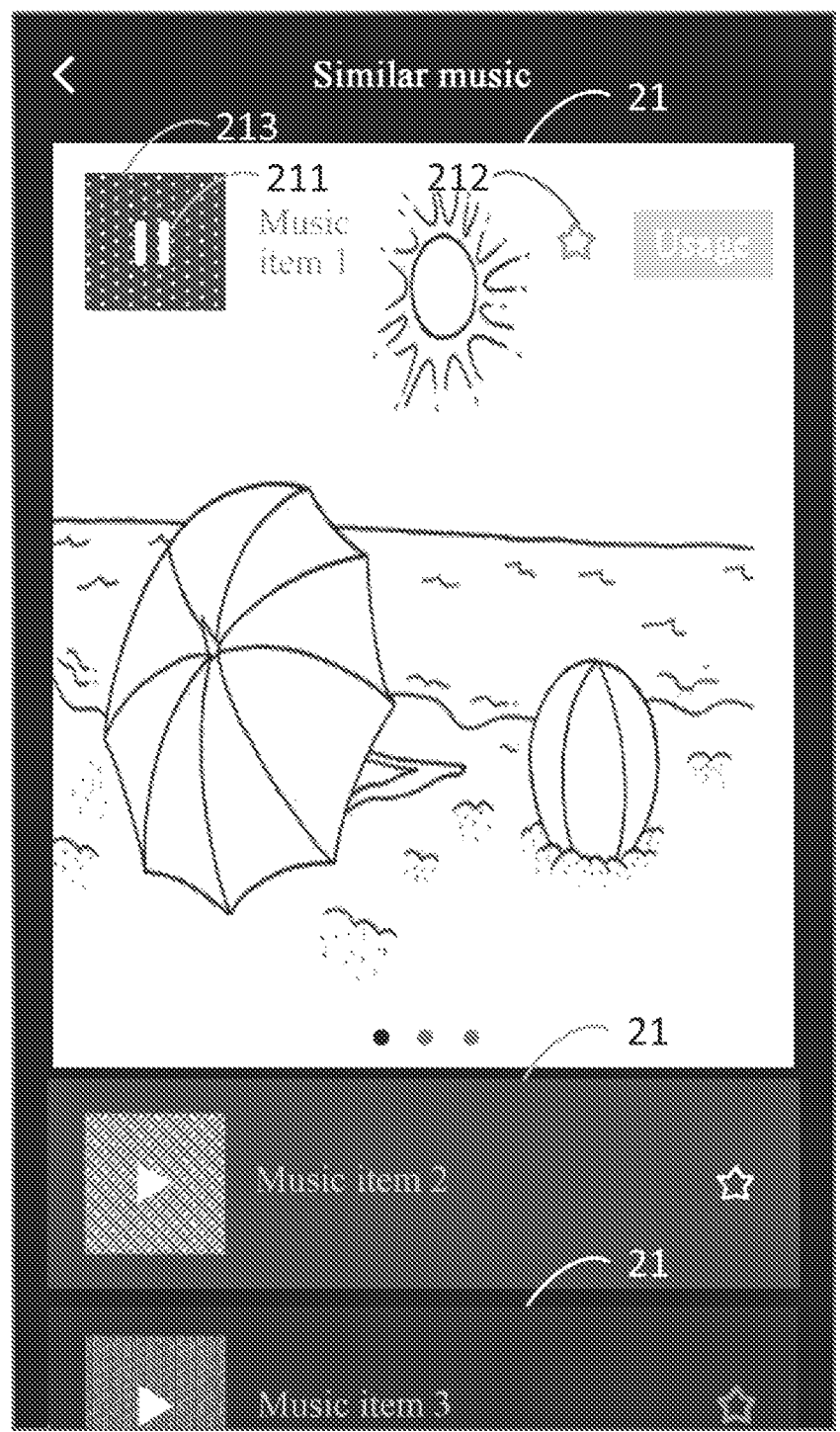
FIG. 5 is a schematic diagram of another music list display interface provided by an embodiment of the present disclosure.

In this embodiment, when moving the upper boundary line/the lower boundary line of the first target display area, the electronic device may simultaneously move the display areas of other music items above/below the first target display area, so as to prevent other music items from being blocked by the expanded first target display area. At this point, preferably, the expanding the height of the first target display area to the set height value further includes: controlling the other display areas above the first target display area in the music list display interface to move upwards synchronously with the upper boundary line; and controlling the other display areas below the first target display area in the music list display interface to move downwards synchronously with the lower boundary line. After the height of the first target display area is expanded to the set height, the music list display interface is shown in FIG. 5, which takes the first target music item as the music item 1 in the music list display interface shown in FIG. 2 as an example.

In addition, when the height of the first target display area is expanded, the first target music item, the music icon, the video playback control and the collection button displayed in the first target display area may move synchronously with the upper boundary line of the first target display area.

Figure 6:
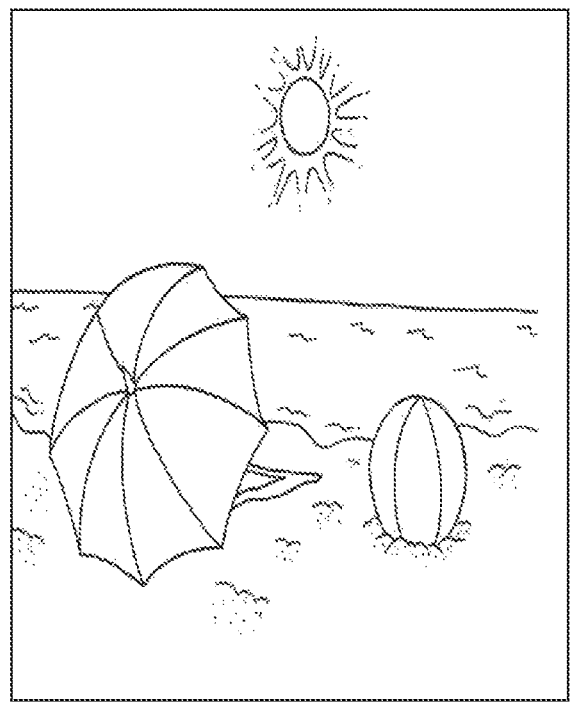
FIG. 6 is a schematic diagram of a current video frame provided by an embodiment of the present disclosure.
Figure 7:
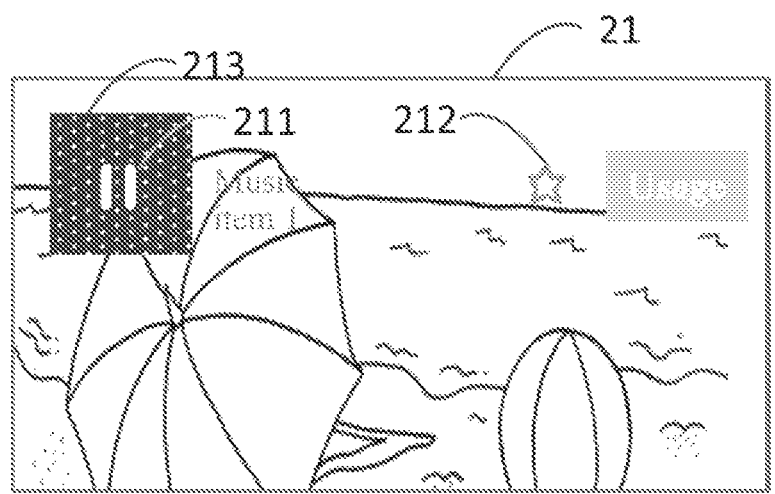
FIG. 7 is a schematic diagram of a display mode of a current video frame provided by an embodiment of the present disclosure.
Figure 8:
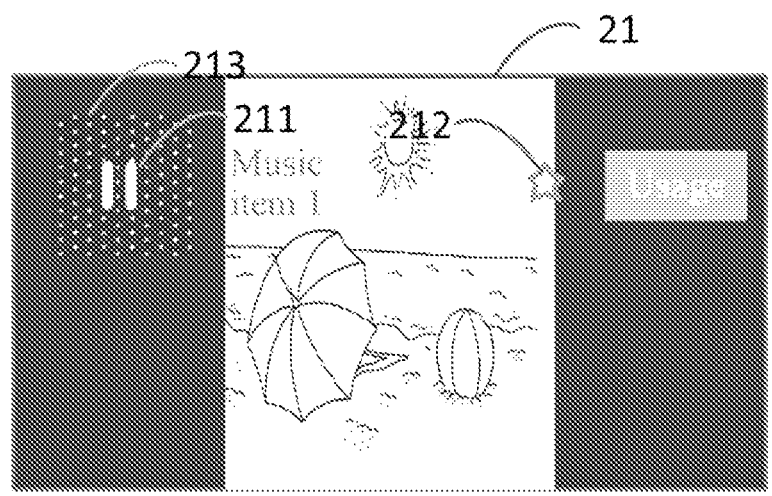
FIG. 8 is a schematic diagram of another display mode of a current video frame provided by an embodiment of the present disclosure.

It can be understood that in the process of expanding the height of the first target display area from the original height value to the set height value, the video frames of the first target video may be displayed completely or incompletely in the first target display area. For example, it is assumed that the current video frame that is required to be displayed currently of the first target display area is shown in FIG. 6, when the height to which the first target display area is currently expanded is lower than the height of the current video frame, the electronic device may display, in the first target display area, only part of the picture whose height is equal to the current height of the first target display area among the current video frame, as shown in FIG. 7. Alternatively, the height and width of the current video frame is reduced in equal proportion until the height of the current video frame coincides with the current height of the first target display area, and the reduced current video frame is displayed in the first target video, as shown in FIG. 8, which is not limited in this embodiment.

In the video playback control method provided by this embodiment, the first video playback instruction, which is generated when the user clicks the video playback control in the first target display area of the first target music item in the music list display interface, is received, the first target video whose background music is the first target music corresponding to the first target music item is played in the first target display area, and the height of the first target display area is expanded to the set height. By adopting the above technical solution, this embodiment may realize the function of playing, through the music list, the video whose background music is the music in the music list. When a user wants to watch the video, he may only directly click the video playback control in the corresponding display area in the music list, and there is no need for the user to search for the video based on the music item in the music list, thereby improving the convenience for the user to watch videos and saving time for the user to search videos.

Figure 9:
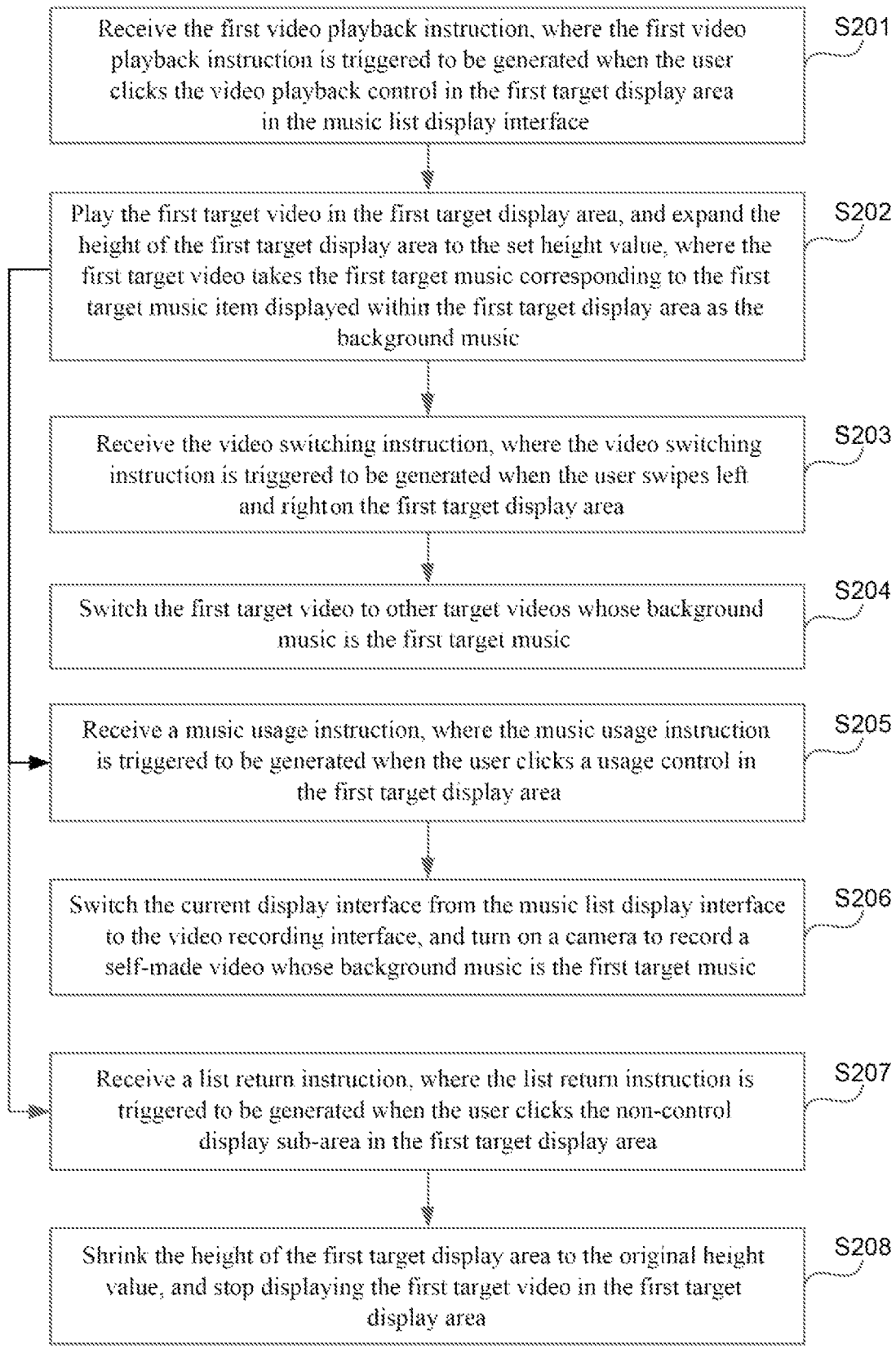
FIG. 9 is a schematic flowchart of another video playback control method provided by an embodiment of the present disclosure.

FIG. 9 is a schematic flowchart of another video playback control method provided by an embodiment of the present disclosure. The solution of this embodiment may be combined with one or more alternative solutions in the above embodiments. In this embodiment, after playing the first target video in the first target display area, it further includes: receiving a video switching instruction, where the video switching instruction is triggered to be generated when the user swipes left and right on the first target display area; and switching the first target video to other target videos whose background music is the first target music.

In an implementation, after playing the first target video in the first target display area, the method further includes: receiving a list return instruction, where the list return instruction is triggered to be generated when the user clicks a non-control display sub-area in the first target display area; and shrinking a height of the first target display area to an original height value, and stopping displaying the first target video in the first target display area.

In an implementation, after playing the first target video in the first target display area, the method further includes: receiving a music usage instruction, where the music usage instruction is triggered to be generated when the user clicks a usage control in the first target display area; and switching a current display interface from the music list display interface to a video recording interface, and turning on a camera to record a self-made video whose background music is the first target music.

Accordingly, as shown in FIG. 9, the video playback control method provided by this embodiment may include the following.

S201, receive the first video playback instruction, where the first video playback instruction is triggered to be generated when the user clicks the video playback control in the first target display area of the first target music item in the music list display interface.

S202, play the first target video in the first target display area, expand the height of the first target display area to the set height value, and perform S203, S205 or S207, where the first target video takes the first target music corresponding to the first target music item as the background music.

S203, receive the video switching instruction, where the video switching instruction is triggered to be generated when the user swipes left and right on the first target display area.

S204, switch the first target video to other target videos whose background music is the first target music, and end the operation.

In this embodiment, the video switching instruction may be used to switch the video displayed in the first target display area.

Specifically, the electronic device displays the first target video whose background music is the first target music to the user through the first target display area, and the user swipes left and right on the first target display area through a touch pen or a finger when wanting to watch other videos whose background music is the first target music. Accordingly, when monitoring the sliding gesture of the user in the first target display area, the electronic device determines that the video switching instruction is received, the other videos whose background music is the first target music is acquired, and the other videos are displayed in the first target display area; for example, when the loading of other videos is not completed, a certain video frame of the other videos is displayed in the first target display area; and when the loading of other videos is completed, the other videos are played in the first target display area.

The video switching instruction may be a video forward switching instruction or a video backward switching instruction. For example, the video backward switching instruction may be generated when the user swipes left on the first target display area, and the video forward switching instruction may be generated when the user swipes right on the first target display area. Accordingly, the electronic device may switch videos in a certain order, for example, the videos whose background music is the first target music may be sorted according to a preset rule, a certain number (for example, 3, 5, 10, etc.) of videos may be selected therefrom as the target videos based on a sorting result, the target video behind the currently displayed target video in the sorting result is displayed every time the video backward switching instruction is received, and the target video before the currently displayed target video in the sorting result is displayed every time the video forward switching instruction is received.

S205, receive a music usage instruction, where the music usage instruction is triggered to be generated when the user clicks a usage control in the first target display area.

S206, switch the current display interface from the music list display interface to the video recording interface, and turn on a camera to record a self-made video whose background music is the first target music, and end the operation.

The music usage instruction may be used for the user to trigger the operation of recording videos whose background music is the first target music. The usage control may pop out from one side (such as the right side) of the first target display area when the electronic device receives the first video playback instruction, and move synchronously with the upper boundary line of the first target display area during or after the pop-out; accordingly, the usage control may be retracted to one side of the target display area according to its pop-out route when the electronic device receives a second video playback instruction or the list return instruction, and move synchronously with the upper boundary line of the first target display area in the retraction process. In addition, when the usage control pops out or retracts from a display side of the collection button (such as the right side of the first target display area), the collection button displayed in the first display area may also move synchronously with the usage control to avoid being blocked by the usage control.

Specifically, the electronic device displays the first target video whose background music is the first target music to the user through the first target display area, and the user clicks the usage control in the first target display area when he wants to record the video with the background music as the first target music; accordingly, when detecting that the user clicks the usage control in the first target display area, the electronic device determines that the music usage instruction is received, and displays the video recording interface and turns on the camera (such as a front camera or a rear camera), so that the user may control the camera in the video recording interface to record the video; and after the video recording is completed, a self-made video whose background music is the first target music may be obtained.

S207, receive a list return instruction, where the list return instruction is triggered to be generated when the user clicks the non-control display sub-area in the first target display area.

S208, shrink the height of the first target display area to the original height value, and stop displaying the first target video in the first target display area.

The list return instruction may be used to return the status that none of the display areas of the music list display interface is performed by a height expansion or displays videos. The non-control display sub-area may be understood as the sub-area in which no control is displayed in the first target display area. Stopping displaying the first target video in the first target display area may be understood as stopping displaying any video frame of the first target video in the first target display area, that is, the video frame is no longer displayed in the first target display area.

Specifically, as shown in FIG. 5, the electronic device displays the target video whose background music is the first target music to the user through the first target display area, and the user clicks the non-control display sub-area in the first target display area when the user does not want to watch the video corresponding to the music which is corresponding to any music item in the music list; accordingly, when detecting that the user clicks on the non-control display sub-area of the first target display area, the electronic device determines that the list return instruction is received, shrinks the height of the first target display area to the original height value, and stops displaying videos in the first target display area. After the shrinking process, the music list display interface of the first target display area can be shown in FIG. 2.

In this embodiment, the shrinking method adopted for shrinking the height of the first target display area to the original height value may be selected as required, for example, only the lower boundary line of the first target display area may be moved upwards, only the upper boundary line of the first target display area may be moved downwards, or the lower boundary line of the first target display area may be moved upwards and the upper boundary line of the first target display area may be moved downwards, at the same time. In this embodiment, it is preferably to control the boundary line (i.e., the boundary line of the first target display area that is moved when the height of the first target display area is expanded) to move a distance which is the same as it moves during expanding, with the same speed value as the speed value and in an opposite direction from the direction during the expanding, so that the music item displayed in the music list display interface after shrinking and the music item displayed in the music list before expansion are at the same display location.

It can be understood that when the upper boundary line of the first target display area moves, other display areas above the first target display area and the first target music item, the music icon, the video playback control and the collection button displayed in the first target area may move synchronously with the upper boundary line; and when the lower boundary line of the first target display area moves, other display areas below the first target display area may move synchronously with the lower boundary line.

In an implementation, the above video playback control method may further include: receiving a second video playback instruction, where the second video playback instruction is triggered to be generated when the user clicks a video playback control in a second target display area in the music list display interface; shrinking a height of the first target display area to an original height value, and stopping displaying the first target video in the first target display area; and playing a second target video in the second target display area and expanding a height of the second target display area to a set height value, where the second target video takes second target music corresponding to a second target music item displayed within the second target area as the background music.

The second video playback instruction may be used to instruct the electronic device to play, in the second target display area, the video whose background music is the second target music corresponding to the second target music item.

Figure 10:
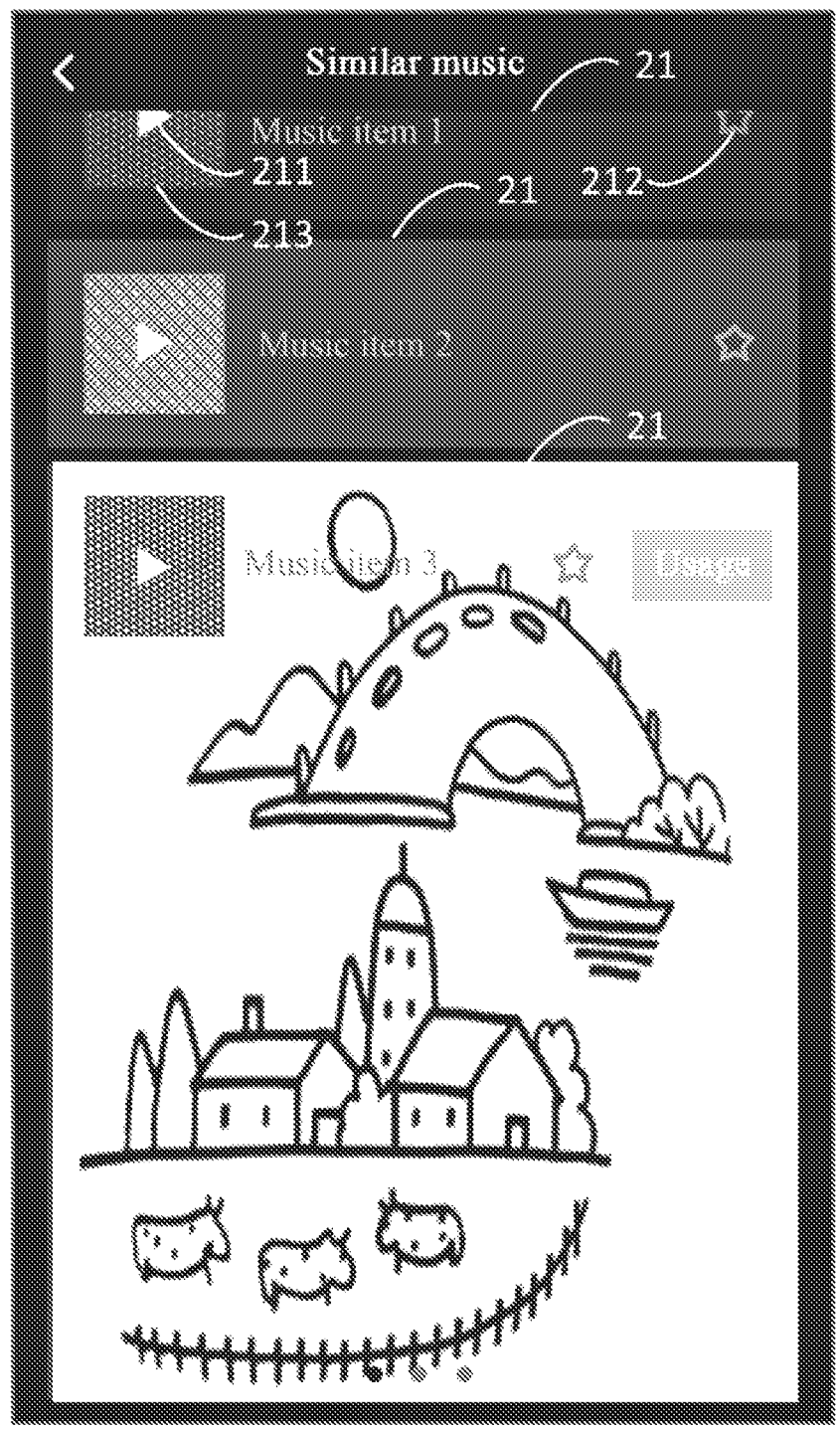
FIG. 10 is a schematic diagram of a third music list display interface provided by an embodiment of the present disclosure.

Specifically, as shown in FIG. 5, when the electronic device plays the first target video in the first target display area, the user may view music items in the music list (such as a music item 3 in FIG. 5) whose display area is completely or partially outside the screen display area of the electronic device by swiping up and down, and the user may click the video playback control in the second target display area that displays the music item when he wants to watch the video whose background music is the music (i.e., the second target music) corresponding to other music items (i.e., the second target music item). Accordingly, when monitoring that the user clicks the video playback control in the second target display area, the electronic device determines that the second video playback instruction is received, stops displaying the first target video in the first target display area, shrinks the height of the first target display area to the original height value, plays the second target video whose background music is the second target music in the second target display area and expands the height of the second target display area to the set height value. The height of the first target display area is shrank to the original height value, and after the height of the second target display area is expanded to the set height value, the music list display interface is shown in FIG. 10. In FIG. 10, for example, the second target music item is taken as the music item 3 in FIG. 5.

Therefore, based on the received different instructions, the electronic device may realize: the switching of the videos displayed in the music list display interface, the recording of the video whose background music is the background music of the currently displayed video, and the return of the original status of the music list, thereby providing more reference videos for the user to record a video and reducing the difficulty of recording a video by the user.

Figure 11:
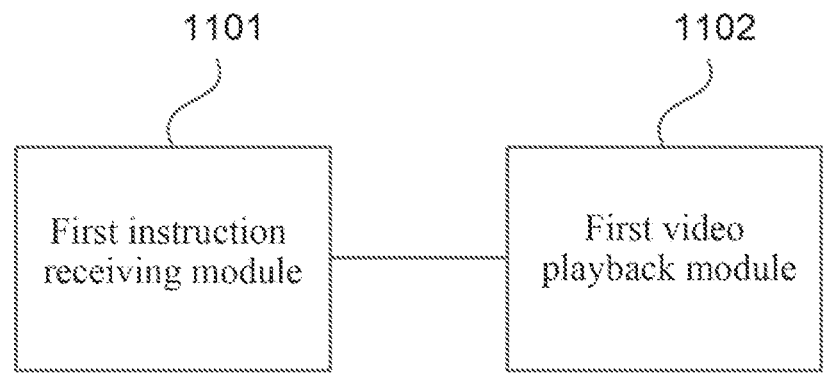
FIG. 11 is a structural block diagram of a video playback control apparatus provided by an embodiment of the present disclosure.

FIG. 11 is a structural block diagram of a video playback control apparatus provided by an embodiment of the present disclosure. The apparatus may be implemented by software and/or hardware, and may be configured in an electronic device, typically, it may be configured in a smart phone or a tablet computer, and the electronic device may be controlled to play videos in the music list display interface through the control apparatus for performing the video playback. As shown in FIG. 11, the apparatus includes a first instruction receiving module 1101 and a first video playback module 1102, where, the first instruction receiving module 1101 is configured to receive a first video playback instruction, where the first video playback instruction is triggered to be generated when a user clicks a video playback control within a first target display area in a music list display interface; and the first video playback module 1102 is configured to play a first target video in the first target display area and expand a height of the first target display area to a set height value, where the first target video takes first target music, corresponding to a first target music item displayed in the first target display area, as background music.

In the video playback control apparatus provided by this embodiment, the first instruction receiving module 1101 receives a first video playback instruction, where the first video playback instruction is generated when a user clicks a video playback control within a first target display area of a first target music item in a music list display interface; and the first video playback module 1102 plays a first target video in the first target display area and expands a height of the first target display area to a set height value, where the first target video takes first target music corresponding to the first target music item as background music. By adopting the above technical solution, this embodiment may realize a function of playing, through the music list, a video whose background music is the music in the music list. When wanting to watch the video, a user may directly click the video playback control in the corresponding display area in the music list, and there is no need for the user to search for the video based on the music item in the music list, thereby improving the convenience for the user to watch videos and saving time for the user to search videos.

In an implementation, the first video playback module 1102 is configured to: move the upper boundary line of the first target display area in the music list display interface upwards until the upper boundary line overlaps with the interface boundary of the music list display interface or the height of the first target display area reaches the set height value; and move the lower boundary line of the first target display area in the music list display interface downwards until the lower boundary line overlaps with the interface boundary of the music list display interface or the height of the first target display area reaches the set height value.

In an implementation, the first video playback module 1102 is configured to: control the other display areas above the first target display area in the music list display interface to move upwards synchronously with the upper boundary line; and control the other display areas below the first target display area in the music list display interface to move downwards synchronously with the lower boundary line.

Further, the video playback control apparatus provided by this embodiment may further include: a second instruction receiving module, configured to receive a second video playback instruction after the first target video is played in the first target display area, where the second video playback instruction is triggered to be generated when the user clicks a video playback control in a second target display area in the music list display interface; a second video playback module, configured to shrink a height of the first target display area to an original height value and stop displaying the first target video in the first target display area; and play a second target video in the second target display area and expand a height of the second target display area to a set height value of the second target display area, where the second target video takes second target music corresponding to a second target music item displayed within the second target area as the background music.

Further, the video playback control apparatus provided by this embodiment may further include: a switching instruction receiving module, configured to receive a video switching instruction after the first target video is played in the first target display area, where the video switching instruction is triggered to be generated when the user swipes left and right on the first target display area; and a video switching module, configured to switch the first target video to other target videos whose background music is the first target music.

Further, the video playback control apparatus provided by this embodiment may further include: a return instruction receiving module, configured to receive a list return instruction after the first target video is played in the first target display area, where the list return instruction is triggered to be generated when the user clicks a non-control display sub-area in the first target display area; and a height shrinking module, configured to shrink a height of the first target display area to an original height value, and stop displaying the first target video in the first target display area.

Further, the video playback control apparatus provided by this embodiment may further include: a usage instruction receiving module, configured to receive a music usage instruction after the first target video is played in the first target display area, where the music usage instruction is triggered to be generated when the user clicks a usage control in the first target display area; and a video recording module, configured to switch a current display interface from the music list display interface to a video recording interface, and turning on a camera to record a self-made video whose background music is the first target music.

Further, the music list display interface is a similar music list display interface of original music, and the video playback control apparatus provided by this embodiment may further include: a display instruction receiving module, configured to receive, before the first video playback instruction is received, a similar music display instruction when displaying a music detail interface of the original music, where the similar music display instruction is triggered to be generated when the user clicks a similar music control in the music detail interface; and a music list display module, configured to switch the current display interface from the music detail interface to the similar music list display interface of the original music, where the similar music list display interface includes at least one display area, a height of the display area is an original height value, and a music item of similar music of the original music is displayed in the display area.

The video playback control apparatus provided by the embodiment of the present disclosure may execute the video playback control method provided by any embodiment of the present disclosure, and has corresponding functional modules and beneficial effects for executing the video playback control method. For technical details not described in this embodiment, please refer to the video playback control method provided by any embodiment of the present disclosure.

Figure 12:
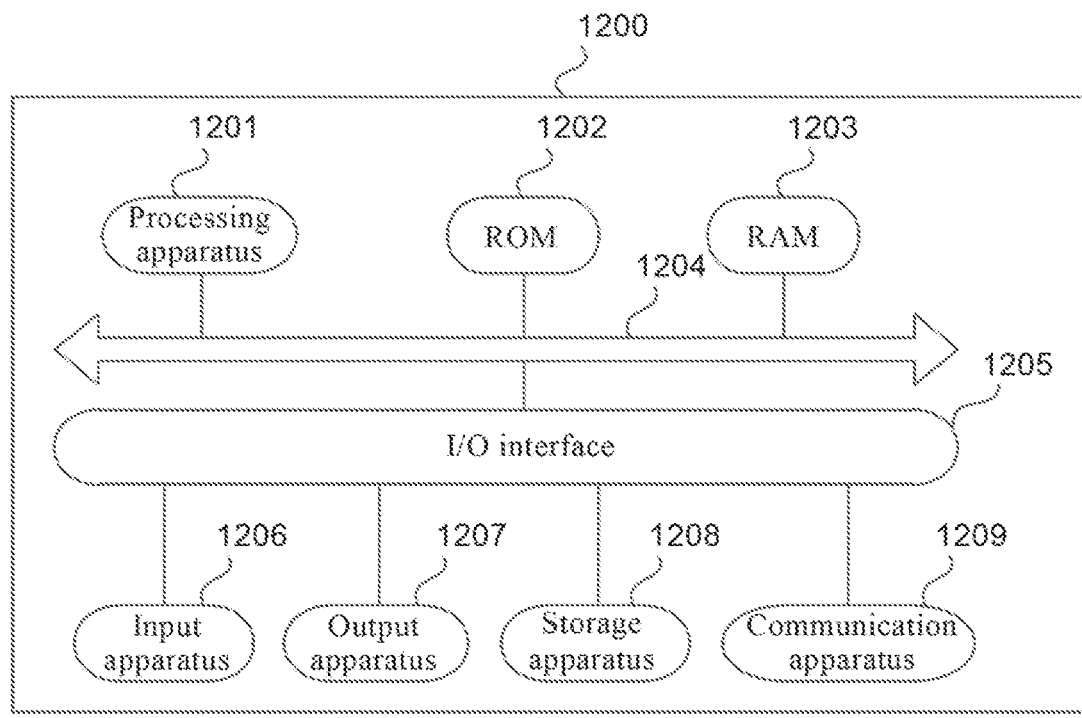
FIG. 12 is a schematic structural diagram of an electronic device provided by an embodiment of the present disclosure.

Referring to FIG. 12, it shows a schematic structural diagram of an electronic device (such as, a terminal device) 1200 applicable to implement the embodiment of the present disclosure. The terminal device in the embodiment of the present disclosure may include, but is not limited to, mobile terminals such as a mobile phone, a notebook computer, a digital broadcast receiver, a PDA (personal digital assistant), a PAD (portable android device), a PMP (portable multimedia player), an on-board terminal (for example, an on-board navigation terminal) and fixed terminals such as a digital TV, and a desktop computer. The electronic device shown in FIG. 12 is only an example, and should not impose any limitation on the function and scope of use of the embodiment of the present disclosure.

As shown in FIG. 12, the electronic device 1200 may include a processing apparatus (such as a central processor and a graphics processor) 1201, which may perform various appropriate actions and processes according to a program stored in a read-only memory (ROM) 1202 or a program loaded from a storage apparatus 1208 into a random access memory (RAM) 1203. The RAM 1203 also stores various programs and data required for the operation of the electronic device 1200. The processing apparatus 1201, the ROM 1202, and the RAM 1203 are connected to each other through a bus 1204. The input/output (I/O) interface 1205 is also connected to the bus 1204.

Generally, the following apparatuses may be connected to the I/O interface 1205: an input apparatus 1206 including, such as a touch screen, a touch panel, a keyboard, a mouse, a camera, a microphone, an accelerometer, and a gyroscope; an output apparatus 1207 including, such as a liquid crystal display (LCD), a speaker, a vibrator; the storage apparatus 1208 including, such as a magnetic tape and a hard disk; and a communication apparatus 1209. The communication apparatus 1209 may allow the electronic device 1200 to perform wireless or wired communication with other devices to exchange data. Although FIG. 12 shows the electronic device 1200 with various apparatuses, it should be understood that it is not required to implement or include all the apparatuses shown. More or fewer apparatuses may be implemented or provided instead.

Particularly, according to the embodiment of the present disclosure, the process described above with reference to the flowchart may be implemented as a computer software program. For example, an embodiment of the present disclosure includes a computer program product, which includes a computer program carried on a non-transitory computer readable medium, and the computer program contains the program code for executing the method shown in the flowchart. In such an embodiment, the computer program may be downloaded and installed from the network through the communication apparatus 1209, or installed from the storage apparatus 1208 or from the ROM 1202.

When the computer program is executed by the processing apparatus 1201, the above functions defined by the method according to the embodiment of the present disclosure are executed. An embodiment of the present disclosure also includes a computer program which, when running on an electronic device, executes the above functions defined in the method of the embodiment of the present disclosure.

It should be noted that the above computer-readable medium of the present disclosure may be a computer-readable signal medium or a computer-readable storage medium, or a combination of the above two. The computer-readable storage medium may be, for example, but not limited to, electrical, magnetic, optical, electromagnetic, infrared, or semiconductor systems, apparatus, or devices, or a combination of any of the above. More specific examples of the computer-readable storage medium may include, but are not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by, or may be used in combination with, an instruction execution system, apparatus, or device. In the present disclosure, however, the computer-readable signal medium may include a data signal propagated in baseband or as part of a carrier wave, and computer-readable program codes are carried in the data signal. The data signal propagated in such a way may take various forms, including but not limited to an electromagnetic signal, an optical signal or any suitable combination of the above. The computer-readable signal medium may also be any computer-readable medium other than the computer-readable storage medium, which may transmit, propagate or transport the program that may be used by, or be used in combination with, the instruction execution system, apparatus, or device. The program code contained in the computer readable medium may be transmitted by any suitable medium, including but not limited to an electric wire, an optical cable, RF (radio frequency), etc., or any suitable combination of the above.

In some implementations, a client and a server may communicate by using any currently known or future developed network protocol such as the HTTP (HyperText Transfer Protocol), and may be interconnected with any form or medium of digital data communication (for example, communication network). Examples of the communication network include the local area network ("LAN"), the wide area network ("WAN"), the Internet work (such as the Internet) and the end-to-end network (for example, an ad hoc end-to-end network), as well as any currently known or future developed networks.

The above computer readable medium may be contained in the above electronic device; or may exist separately without being assembled into the electronic device.

The above computer readable medium carries one or more programs which, when executed by the electronic device, causes the electronic device to: receive a first video playback instruction, where the first video playback instruction is triggered to be generated when a user clicks a video playback control within a first target display area in a music list display interface; and play a first target video in the first target display area and expand a height of the first target display area to a set height value, where the first target video takes first target music, corresponding to a first target music item displayed in the first target display area, as background music.

Program codes used to execute the operations of the present disclosure may be written in one or more programming languages or their combinations, where the program codes include but is not limited to object-oriented programming languages such as Java, Smalltalk, C++, and conventional procedural programming languages such as the "C" language or similar programming languages. The program codes may be executed wholly or partly on a user computer, be executed as an independent software package, be executed partly on the user computer and partly on a remote computer, or be executed wholly on the remote computer or the server. In the case of a remote computer, the remote computer may be connected to the user computer through any kind of network, including the local area network (LAN) or the wide area network (WAN), or it may be connected to an external computer (for example, using an Internet service provider to connect through the Internet).

The flowchart and block diagram in the accompanying drawings illustrate possible architectures, functions, and operations of a system, a method, and a computer program product according to the embodiments of the present disclosure. In this regard, each box in the flowchart or the block diagram may represent a module, a program segment, or part of a code, which contain one or more executable instructions for implementing the specified logical function. It should also be noted that, in some alternative implementations, the functions marked in the box may also occur in a different order than those marked in the drawings. For example, two consecutive boxes may actually be executed in parallel, basically, and sometimes they may be executed in a reverse order, depending on the functions involved. It should also be noted that each box in the block diagram and/or the flowchart, and the combination of boxes in the block diagram and/or the flowchart, may be implemented by a dedicated hardware-based system that performs specified functions or operations, or may be implemented by a combination of dedicated hardware and computer instructions.

The units involved in the embodiments described in the present disclosure may be implemented by software or hardware. The name of a module does not constitute a limitation on the module itself in some cases.

The functions described above herein may be performed at least in part by one or more hardware logic components. For example, without limitation, exemplary types of hardware logic components that may be used include: a field programmable gate array (FPGA), an application specific integrated circuit (ASIC), an application specific standard product (ASSP), a system-on-chip (SOC), a complex programmable logic device (CPLD), etc.

In the context of the present disclosure, a machine-readable medium may be a tangible medium, which may contain or store a program for use by the instruction execution system, apparatus, or device, or for use in connection with the instruction execution system, apparatus, or device. The machine-readable medium may be a machine-readable signal medium or a machine-readable storage medium. The machine-readable medium may include, but not limited to the system, apparatus, or device in the following forms: electronic, magnetic, optical, electromagnetic, infrared, or semiconductor, or may include any suitable combination of the above. More specific examples of machine-readable storage medium may include the electrical connection based on one or more wires, a portable computer disk, the hard disk, the random access memory (RAM), the read-only memory (ROM), the erasable programmable read-only memory (EPROM or flash memory), the optical fiber, the portable compact disk read-only memory (CD-ROM), the optical storage device, the magnetic storage device, or any suitable combination of the above.

According to one or more embodiments of the present disclosure, Example 1 provides a video playback control method, including:

receiving a first video playback instruction, where the first video playback instruction is triggered to be generated when a user clicks a video playback control within a first target display area in a music list display interface; and playing a first target video in the first target display area and expanding a height of the first target display area to a set height value, where the first target video takes first target music, corresponding to a first target music item displayed in the first target display area, as background music.

According to one or more embodiments of the present disclosure, in Example 2, based on the method described in Example 1, the expanding the height of the first target display area to the set height value includes:

moving an upper boundary line of the first target display area in the music list display interface upwards until the upper boundary line overlaps with an interface boundary of the music list display interface or the height of the first target display area reaches the set height value; and moving a lower boundary line of the first target display area in the music list display interface downwards until the lower boundary line overlaps with the interface boundary of the music list display interface or the height of the first target display area reaches the set height value.

According to one or more embodiments of the present disclosure, in Example 3, based on the method described in Example 2, the expanding the height of the first target display area to the set height value further includes:

controlling other display areas above the first target display area in the music list display interface to move upwards synchronously with the upper boundary line; and controlling the other display areas below the first target display area in the music list display interface to move downwards synchronously with the lower boundary line.

According to one or more embodiments of the present disclosure, in Example 4, based on the method described in Example 1, the expanding the height of the first target display area to the set height value includes:

moving an upper boundary line of the first target display area in the music list display interface upwards until the height of the first target display area reaches the set height value; or moving a lower boundary line of the first target display area in the music list display interface downwards until the height of the first target display area reaches the set height value.

According to one or more embodiments of the present disclosure, in Example 5, based on the method according to any one of Examples 1 to 4, after playing the first target video in the first target display area, further including:

receiving a second video playback instruction, where the second video playback instruction is triggered to be generated when the user clicks a video playback control in a second target display area in a music list display interface; and shrinking a height of the first target display area to an original height value, and stopping displaying the first target video in the first target display area; and playing a second target video in the second target display area and expanding a height of the second target display area to a set height value, where the second target video takes second target music corresponding to a second target music item displayed within the second target area as the background music.

According to one or more embodiments of the present disclosure, in Example 6, based on the method according to any one of Examples 1 to 4, after playing the first target video in the first target display area, further including:

receiving a video switching instruction, where the video switching instruction is triggered to be generated when the user swipes left and right on the first target display area; and switching the first target video to other target videos whose background music is the first target music.

According to one or more embodiments of the present disclosure, in Example 7, based on the method according to any one of Examples 1 to 4, after playing the first target video in the first target display area, further including:

receiving a list return instruction, where the list return instruction is triggered to be generated when the user clicks a non-control display sub-area in the first target display area; and shrinking a height of the first target display area to an original height value, and stopping displaying the first target video in the first target display area.

According to one or more embodiments of the present disclosure, in Example 8, based on the method according to any one of Examples 1 to 4, after playing the first target video in the first target display area, further including:

receiving a music usage instruction, where the music usage instruction is triggered to be generated when the user clicks a usage control in the first target display area; and switching a current display interface from the music list display interface to a video recording interface, and turning on a camera to record a self-made video whose background music is the first target music.

According to one or more embodiments of the present disclosure, in Example 9, based on the method according to Example 1, the music list display interface is a similar music list display interface of original music, and before receiving the first video playback instruction, further including:

receiving a similar music display instruction when displaying a music detail interface of the original music, where the similar music display instruction is triggered to be generated when the user clicks a similar music control in the music detail interface; and switching the current display interface from the music detail interface to the similar music list display interface of the original music, where the similar music list display interface includes at least one display area, a height of the display area is an original height value, and a music item of similar music of the original music is displayed in the display area.

According to one or more embodiments of the present disclosure, in Example 10, there is provided a video playback control apparatus, including:

a first instruction receiving module, configured to receive a first video playback instruction, where the first video playback instruction is triggered to be generated when a user clicks a video playback control within a first target display area in a music list display interface; and a first video playback module, configured to play a first target video in the first target display area and expand a height of the first target display area to a set height value, where the first target video takes first target music, corresponding to a first target music item displayed in the first target display area, as background music.

According to one or more embodiments of the present disclosure, Example 11 provides an electronic device, including:

one or more processors;

a memory, configured to store one or more programs, where the one or more programs, when executed by the one or more processors, enable the one or more processors to implement the video playback control method according to any one of Examples 1 to 9.

According to one or more embodiments of the present disclosure, Example 12 provides a computer-readable storage medium having stored thereon a computer program which, when executed by a processor, implements the video playback control method according to any one of Examples 1 to 9.

According to one or more embodiments of the present disclosure, Example 13 provides a computer program product including a computer program carried on a non-transitory computer readable medium, where the computer program, when executed by a processor, cause the processor to implement the video playback control method according to any one of Examples 1 to 9.

According to one or more embodiments of the present disclosure, Example 14 provides a computer program which, when running on an electronic device, causes the electronic device to implement the video playback control method according to any one of Examples 1 to 9.

The above description is merely the preferred embodiment of the present disclosure and an illustration of the technical principles used. Those skilled in the art should understand that the disclosure scope involved in the present disclosure is not limited to the technical solutions formed by the specific combination of the above technical features; at the same time, it should also cover, without departing from the above disclosed concept, other technical solutions formed by any combination of the above technical features or their equivalents, for example, the technical solution that is formed by replacing the above features with the technical features (but not limited to) having similar functions that are disclosed in the present disclosure.

In addition, although operations are illustrated in a particular order, this should not be understood, however, as requiring the operations to be performed in the particular order shown or in a sequential order. Under certain circumstances, multitasking and parallel processing may be beneficial. Likewise, although the above discussion contains several specific implementation details, these should not be construed as limitations on the scope of the present disclosure. Some features described in the context of separate embodiments may also be implemented in combination in a single embodiment. Conversely, the features described in the context of a single embodiment may also be implemented in multiple embodiments separately or in any appropriate sub-combination.

Although the subject has been described in a language specific to structural features and/or logical actions of the method, it should be understood, however, that the subject defined in the appended claims is not necessarily limited to the specific features or actions described above. On the contrary, the specific features and actions described above are merely example forms for implementing the claims.

What is claimed is:

1. A video playback control method, comprising:

receiving a first video playback instruction, wherein the first video playback instruction is triggered to be generated when a user clicks a video playback control within a first target display area in a music list display interface; and in response to the received first video playback instruction, playing a first target video in the first target display area in the music list display interface and expanding a height of the first target display area in the music list display interface to a set height value, wherein the first target video takes first target music, corresponding to a first target music item displayed in the first target display area in the music list display interface, as background music, each music item corresponds to one display area in the music list display interface, and each music item is displayed in the display area in the music list display interface, wherein, after playing the first target video in the first target display area in the music list display interface, the method further comprises:

receiving a music usage instruction, wherein the music usage instruction is triggered to be generated when the user clicks a usage control in the first target display area in the music list display interface; and switching a current display interface from the music list display interface to a video recording interface, and turning on a camera to record a self-made video whose background music is the first target music, wherein, during expanding the height of the first target display area in the music list display interface to the set height value, the method further comprises:

displaying video frames of the first target video in the first target display area in the music list display interface, and wherein, after playing the first target video in the first target display area in the music list display interface, the method further comprises:

receiving a list return instruction, wherein the list return instruction is triggered to be generated when the user clicks a non-control display sub-area in the first target display area in the music list display interface; and shrinking the height of the first target display area in the music list display interface to an original height value, and stopping displaying the first target video in the first target display area in the music list display interface.

2. The method according to claim 1, wherein the expanding the height of the first target display area in the music list display interface to the set height value comprises:

moving an upper boundary line of the first target display area in the music list display interface upwards until the upper boundary line overlaps with an interface boundary of the music list display interface or the height of the first target display area reaches the set height value; and moving a lower boundary line of the first target display area in the music list display interface downwards until the lower boundary line overlaps with the interface boundary of the music list display interface or the height of the first target display area reaches the set height value.

3. The method according to claim 2, wherein the expanding the height of the first target display area in the music list display interface to the set height value further comprises:

controlling other display areas above the first target display area in the music list display interface to move upwards synchronously with the upper boundary line; and controlling the other display areas below the first target display area in the music list display interface to move downwards synchronously with the lower boundary line.

4. The method according to claim 1, wherein the expanding the height of the first target display area in the music list display interface to the set height value comprises:
moving an upper boundary line of the first target display area in the music list display interface upwards until the height of the first target display area reaches the set height value; or
moving a lower boundary line of the first target display area in the music list display interface downwards until the height of the first target display area reaches the set height value.

5. The method according to claim 1, after playing the first target video in the first target display area in the music list display interface, further comprising:
receiving a second video playback instruction, wherein the second video playback instruction is triggered to be generated when the user clicks a video playback control in a second target display area in the music list display interface; and
playing a second target video in the second target display area and expanding a height of the second target display area to a set height value of the second target display area, wherein the second target video takes second target music corresponding to a second target music item displayed within the second target area as the background music.

6. The method according to claim 1, after playing the first target video in the first target display area in the music list display interface, further comprising:
receiving a video switching instruction, wherein the video switching instruction is triggered to be generated when the user swipes left and right on the first target display area; and
switching the first target video to other target videos whose background music is the first target music.

7. The method according to claim 1, wherein the music list display interface is a same type of music list display interface of original music, and before receiving the first video playback instruction, the method further comprises:
receiving a same type of music display instruction when displaying a music detail interface of the original music, wherein the same type of music display instruction is triggered to be generated when the user clicks a same type of music control in the music detail interface; and
switching the current display interface from the music detail interface to the same type of music list display interface of the original music, wherein the same type of music list display interface comprises at least one display area, a height of the display area is the original height value, and a music item of a same type of music of the original music is displayed in the display area.

8. A video playback control apparatus, comprising:
one or more processors;
a memory, configured to store one or more programs, wherein the one or more programs, when executed by the one or more processors, enable the one or more processors to:
receive a first video playback instruction, wherein the first video playback instruction is triggered to be generated when a user clicks a video playback control within a first target display area in a music list display interface; and
in response to the received first video playback instruction, play a first target video in the first target display area in the music list display interface and expand a height of the first target display area in the music list display interface to a set height value, wherein the first target video takes first target music, corresponding to a first target music item displayed in the first target display area in the music list display interface, as background music, each music item corresponds to one display area, and each music item is displayed in the display area;
wherein, after playing the first target video in the first target display area in the music list display interface, the one or more processors are further enabled to:
receive a music usage instruction, wherein the music usage instruction is triggered to be generated when the user clicks a usage control in the first target display area in the music list display interface; and
switch a current display interface from the music list display interface to a video recording interface, and turn on a camera to record a self-made video whose background music is the first target music,
wherein, during expanding the height of the first target display area in the music list display interface to the set height value, the one or more processors are further enabled to:
display video frames of the first target video in the first target display area in the music list display interface, and
wherein, after playing the first target video in the first target display area in the music list display interface, the one or more processors are further enabled to:
receive a list return instruction, wherein the list return instruction is triggered to be generated when the user clicks a non-control display sub-area in the first target display area in the music list display interface; and
shrink the height of the first target display area in the music list display interface to an original height value, and stop displaying the first target video in the first target display area in the music list display interface.

9. The apparatus according to claim 8, wherein the one or more processors are further enabled to:
move an upper boundary line of the first target display area in the music list display interface upwards until the upper boundary line overlaps with an interface boundary of the music list display interface or the height of the first target display area reaches the set height value; and
move a lower boundary line of the first target display area in the music list display interface downwards until the lower boundary line overlaps with the interface boundary of the music list display interface or the height of the first target display area reaches the set height value.

10. The apparatus according to claim 9, wherein the one or more processors are further enabled to:
control other display areas above the first target display area in the music list display interface to move upwards synchronously with the upper boundary line; and
control the other display areas below the first target display area in the music list display interface to move downwards synchronously with the lower boundary line.

11. The apparatus according to claim 8, wherein the one or more processors are further enabled to:
move an upper boundary line of the first target display area in the music list display interface upwards until the height of the first target display area reaches the set height value; or
move a lower boundary line of the first target display area in the music list display interface downwards until the height of the first target display area reaches the set height value.

12. The apparatus according to claim 8, wherein, after playing the first target video in the first target display area in the music list display interface, the one or more processors are further enabled to:
receive a second video playback instruction, wherein the second video playback instruction is triggered to be generated when the user clicks a video playback control in a second target display area in the music list display interface; and
play a second target video in the second target display area and expanding a height of the second target display area to a set height value of the second target display area, wherein the second target video takes second target music corresponding to a second target music item displayed within the second target area as the background music.

13. The apparatus according to claim 8, wherein, after playing the first target video in the first target display area in the music list display interface, the one or more processors are further enabled to:
receive a video switching instruction, wherein the video switching instruction is triggered to be generated when the user swipes left and right on the first target display area; and
switch the first target video to other target videos whose background music is the first target music.

14. The apparatus according to claim 8, wherein the music list display interface is a same type of music list display interface of original music, and before receiving the first video playback instruction, the one or more processors are further enabled to:
receive a same type of music display instruction when displaying a music detail interface of the original music, wherein the same type of music display instruction is triggered to be generated when the user clicks a same type of music control in the music detail interface; and
switch the current display interface from the music detail interface to the same type of music list display interface of the original music, wherein the same type of music list display interface comprises at least one display area, a height of the display area is the original height value, and a music item of a same type of music of the original music is displayed in the display area.

15. A non-transitory computer-readable storage medium, wherein the medium stores thereon a computer program which, when executed by a processor, implements the following steps:
receiving a first video playback instruction, wherein the first video playback instruction is triggered to be generated when a user clicks a video playback control within a first target display area in a music list display interface; and
in response to the received first video playback instruction, playing a first target video in the first target display area in the music list display interface and expanding a height of the first target display area in the music list display interface to a set height value, wherein the first target video takes first target music, corresponding to a first target music item displayed in the first target display area in the music list display interface, as background music, each music item corresponds to one display area, and each music item is displayed in the display area;
wherein, after playing the first target video in the first target display area in the music list display interface, the computer program, when executed by the processor, further implements the following steps:
receiving a music usage instruction, wherein the music usage instruction is triggered to be generated when the user clicks a usage control in the first target display area in the music list display interface; and
switching a current display interface from the music list display interface to a video recording interface, and turning on a camera to record a self-made video whose background music is the first target music,
wherein, during expanding the height of the first target display area in the music list display interface to the set height value, the computer program, when executed by the processor, further implements the following step:
displaying video frames of the first target video in the first target display area in the music list display interface, and
wherein, after playing the first target video in the first target display area in the music list display interface, the computer program, when executed by the processor, further implements the following step:
receiving a list return instruction, wherein the list return instruction is triggered to be generated when the user clicks a non-control display sub-area in the first target display area in the music list display interface; and
shrinking the height of the first target display area in the music list display interface to an original height value, and stopping displaying the first target video in the first target display area in the music list display interface.

16. The medium according to claim 15, wherein the computer program, when executed by the processor, further implements the following steps:
moving an upper boundary line of the first target display area in the music list display interface upwards until the upper boundary line overlaps with an interface boundary of the music list display interface or the height of the first target display area reaches the set height value; and
moving a lower boundary line of the first target display area in the music list display interface downwards until the lower boundary line overlaps with the interface boundary of the music list display interface or the height of the first target display area reaches the set height value.

* * * * *